United States Patent
Park et al.

(10) Patent No.: US 9,154,544 B2
(45) Date of Patent: Oct. 6, 2015

(54) DEVICE AND METHOD FOR SUPPORTING INTERNET-BASED SENSOR DATA TRANSMISSION

(71) Applicant: Electronics and Telecommunications Research Institute, Daejeon (KR)

(72) Inventors: Il-Kyun Park, Gwangju (KR); Sim-Kwon Yoon, Gwangju (KR); Seok-Kap Ko, Gwangju (KR); Byung-Tak Lee, Suwon (KR); Young-Sun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 158 days.

(21) Appl. No.: 13/925,725

(22) Filed: Jun. 24, 2013

(65) Prior Publication Data

US 2014/0198713 A1    Jul. 17, 2014

(30) Foreign Application Priority Data

Jan. 11, 2013  (KR) .................. 10-2013-0003541

(51) Int. Cl.
*H04J 3/16* (2006.01)
*H04L 29/08* (2006.01)
*H04W 4/00* (2009.01)
*H04W 84/18* (2009.01)

(52) U.S. Cl.
CPC .............. *H04L 67/06* (2013.01); *H04L 67/125* (2013.01); *H04W 4/006* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2009/0073983 A1* | 3/2009 | Kim | 370/392 |
| 2009/0141741 A1 | 6/2009 | Kim et al. | |
| 2009/0146833 A1* | 6/2009 | Lee et al. | 340/825.52 |
| 2014/0067902 A1* | 3/2014 | Wang et al. | 709/201 |

FOREIGN PATENT DOCUMENTS

| | | |
|---|---|---|
| KR | 10-2009-0012959 A | 2/2009 |
| KR | 10-2012-0064542 A | 6/2012 |
| KR | 10-2012-0078335 A | 7/2012 |

\* cited by examiner

*Primary Examiner* — Frank Duong

(57) ABSTRACT

Provided is a method of supporting CoAP-based sensor data transmission between a sensor data collector in a sensor node relay and one or more 6LoWPAN-unsupported sensor nodes. The method includes receiving a CoAP sensor data request message from the sensor data collector, transmitting a CoAP sensor data request message to a corresponding 6LoWPAN-unsupported sensor node by analyzing the received CoAP sensor data request message, and responding to the sensor data collector by creating a CoAP sensor data response message including sensor data received from one or more of the 6LoWPAN-unsupported sensor nodes.

16 Claims, 7 Drawing Sheets

DEVICE AND METHOD FOR SUPPORTING INTERNET-BASED SENSOR DATA TRANSMISSION

CROSS-REFERENCE TO RELATED APPLICATION

This application claims the benefit under 35 U.S.C. §119(a) of Korean Patent Application No. 10-2013-0003541, filed on Jan. 11, 2013, the entire disclosure of which is incorporated herein by reference for all purposes.

BACKGROUND

1. Field

The following description relates to a device and method for supporting sensor node data transmission, and more particularly, to a device and method for supporting sensor data transmission using a CoAP protocol in a sensor node which does not use a TCP/IP-based 6LoWPAN.

2. Description of the Related Art

An IPv6 over low-power wireless personal area networks (6LoWPAN) is a communication technology for building a TCP/IP-based sensor network, and it is being standardized by the Internet Engineering Task Force (IETF) organization.

When this 6LoWPAN technology is incorporated into a sensor network, it is possible to develop a variety of applications with ease, according to convergence with existing Internet-based technologies. A CoAP, a type of the 6LoWPAN technology, has an advantage in that RESTful services can be extensively applied by integration with the Internet web.

However, a plurality of sensor nodes installed in the field have a minimum specification required to acquire and transmit sensor data, and interfaces having a high probability of delay and loss, for example, a serial communication, RS485, CAN, and ZigBee, which have a relatively low speed, other than the Ethernet or WiFi, which can easily apply the 6LoWPAN technology, are used. Therefore, it is currently difficult to apply the 6LoWPAN technology to all sensor nodes.

SUMMARY

The following description relates to applying a RESTful-based application service in an integrated manner between a 6LoWPAN-supported sensor network and a 6LoWPAN-unsupported sensor network by enabling communication using a CoAP protocol in common in a sensor network.

In one general aspect, there is provided a device which includes a connecting unit that can access the Internet through a sensor node relay and transmits and receives an Internet-based message to and from a sensor data collector, an interface to connect one or more Internet-unsupported sensor nodes, a request processing unit that transmits a sensor data request message to one or more of the Internet-unsupported sensor nodes through the interface by analyzing the CoAP sensor data request message received from the sensor data collector through the connecting unit, and a response processing unit that creates a sensor data response message including sensor data received from one or more of the Internet-unsupported sensor nodes through the interface and transmits it to the sensor data collector through the connecting unit.

In another aspect, there is provided a method of supporting Internet-based sensor data transmission between a sensor data collector in a sensor node relay and one or more Internet-unsupported sensor nodes, the method including receiving a sensor data request message from the sensor data collector, transmitting a sensor data request message to a corresponding Internet-unsupported sensor node by analyzing the received sensor data request message, and responding to the sensor data collector by creating a sensor data response message including sensor data received from one or more of the Internet-unsupported sensor nodes.

Other features and aspects will be apparent from the following detailed description, the drawings, and the claims.

Figure 1:
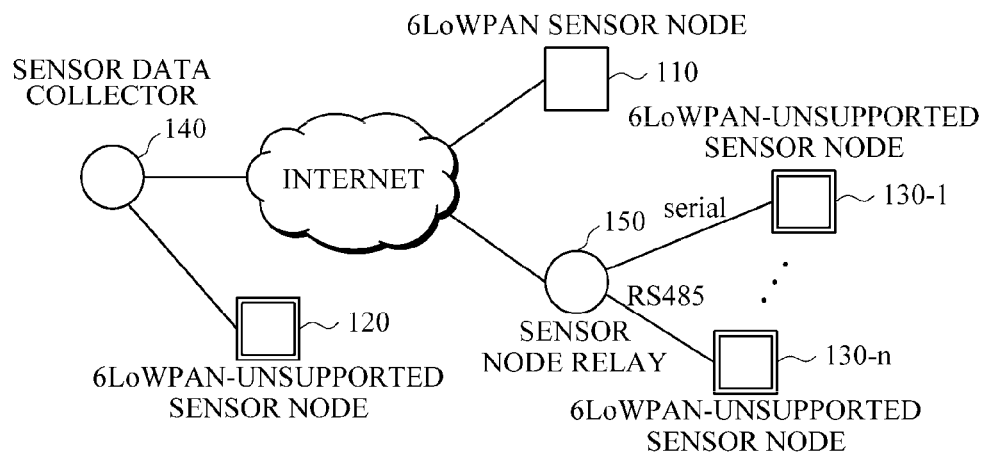
FIG. 1 is a diagram illustrating a configuration of a sensor network system according to an embodiment of the invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Hereinafter, exemplary embodiments of the invention will be described in detail with reference to the accompanying drawings. The exemplary embodiments described below should be considered in a descriptive sense only, in order to facilitate understanding of the invention, and the scope of the invention is not limited by the exemplary embodiments.

FIG. 1 is a diagram illustrating a configuration of a sensor network system according to an embodiment of the invention.

As illustrated in FIG. 1, sensor nodes may be classified into a 6LoWPAN sensor node 110 and 6LoWPAN-unsupported sensor nodes 120, 130-1, ..., and 130-n.

The 6LoWPAN sensor node 110 may transmit and receive sensor data using a CoAP protocol in a TCP/IP-based network. The 6LoWPAN-unsupported sensor nodes 120, 120-1, ..., and 120-n may not transmit and receive sensor data using the CoAP protocol in the TCP/IP-based network, but may transmit and receive sensor data using a serial, a RS485, and a ZigBee communication method.

A sensor data collector 140 collects sensor data from sensor nodes 110, 120, 130-1, ..., and 130-n.

The sensor data collector 140 and the 6LoWPAN sensor node 110 exchange sensor data over the Internet using the CoAP protocol of the 6LoWPAN.

The sensor data collector 140 and 6LoWPAN-unsupported sensor nodes 120, 130-1, ..., and 130-n may not exchange sensor data over the Internet using the CoAP protocol of the 6LoWPAN.

However, the 6LoWPAN-unsupported sensor node 120, which is directly connected to the sensor data collector 140 using the serial, RS485, or ZigBee, may transmit and receive sensor data using the serial, RS485, or ZigBee method for sensor data transmission.

However, the 6LoWPAN-unsupported sensor nodes 130-1, . . . , and 130-n, which are connected to the sensor data collector 140 over the Internet, may not independently transmit sensor data to the sensor data collector 140. Accordingly, a sensor node relay 150 is provided in order to transform and transmit the sensor data between the sensor data collector 140 and the 6LoWPAN-unsupported sensor nodes 130-1, . . . , and 130-n.

A specific configuration for relaying transmission and reception of the sensor data between the sensor data collector 140 and the 6LoWPAN-unsupported sensor nodes 130-1, . . . , and 130-n will be described.

The sensor node relay 150 may have two embodiments based on a CoAP URL configuration of a CoAP sensor data request message. That is, in order to clearly identify each sensor node, when the sensor data collector 140 requests data on an individual sensor node, it is necessary to add information on the sensor node in the CoAP URL, which represents header content of the CoAP sensor data request message as general text.

In one general aspect, only path information is included in the CoAP URL. In this case, the sensor node relay 150 determines an interface to connect the sensor node and a sensor node ID corresponding to the path information of the CoAP URL, and transmits a sensor data request message to the corresponding sensor node through a determined interface. A detailed description of this procedure will be provided below with reference to FIG. 2.

In another aspect, a corresponding sensor node ID and an interface are explicitly represented in the CoAP URL. In this case, the sensor node relay 150 transmits a sensor data request message to the corresponding sensor node through the interface, which is explicitly indicated in the CoAP URL. A detailed description of this procedure will be given below with reference to FIG. 3.

Figure 2:
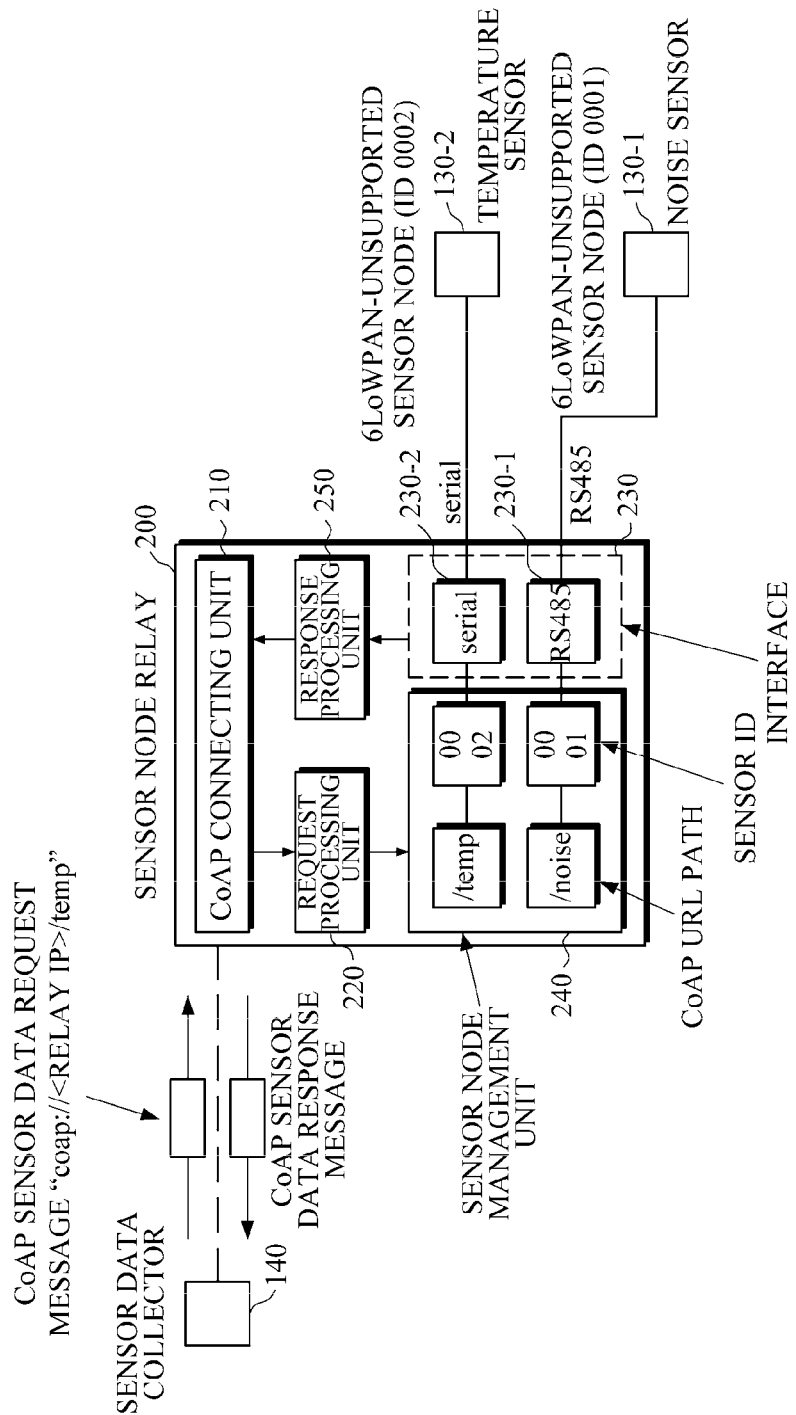
FIG. 2 a diagram illustrating a configuration of a sensor node relay according to the embodiment of the invention.

FIG. 2 a diagram illustrating a configuration of the sensor node relay according to the embodiment of the invention.

As illustrated in FIG. 2, a sensor node relay 200 specifically includes a connecting unit 210, a request processing unit 220, an interface 230, a sensor node management unit 240, and a response processing unit 250.

The connecting unit 210 can access the TCP/IP-based Internet, and transmits and receives a CoAP-based message to and from the sensor data collector 140.

The request processing unit 220 analyzes the CoAP sensor data request message received from the sensor data collector 140 through the connecting unit 210. For example, the URL of the CoAP sensor data request message may include only path information (/temp), for example, "coap://<relay IP>/temp." Then, the request processing unit 220 inputs this path information(/temp) to the sensor node management unit 240.

However, in order to reduce its size, the header of the CoAP protocol message does not use the same information contained in headers of its upper layers. Therefore, information on size of the CoAP message is obtained in a TCP or UDP header, and ID information of both nodes that transmit and receive the CoAP message is obtained in an IP header. However, since the 6LoWPAN-unsupported sensor node, which does not use the TCP/IP stack, may not obtain the TCP or UDP header and the IP header, the request processing unit 220 needs to define a shim header including associated information, and transmits the shim header attached above the CoAP header. A detailed description of the shim header will be given below with reference to FIG. 4.

Since the sensor node management unit 240 includes sensor node ID information matching information on each path, it detects a sensor node ID based on input path information and transmits the CoAP sensor data request message through the interface 230 in order to connect to the sensor node corresponding to the ID.

As illustrated in FIG. 2, a case in which a noise sensor 130-1 and a temperature sensor 130-2, which are the 6LoWPAN-unsupported sensor nodes and satisfy specifications in Table 1, are connected to the sensor node relay 200 will be taken as an example.

TABLE 1

| Type | ID | Interface | Path information |
|---|---|---|---|
| Noise sensor | 0001 | RS485 | /noise |
| Temperature sensor | 0002 | serial | /temp |

When URL "coap://<relay IP>/temp" is included in the CoAP sensor data request message, the sensor node management unit 240 recognizes that sensor data of the temperature sensor 130-2 having a sensor node ID 0002 is requested from the '/temp' value, connects to the temperature sensor 130-2 through a serial interface 230-2, and transmits the CoAP sensor data request message.

The response processing unit 250 allows the CoAP sensor data response message including sensor data received from the sensor nodes 130-1 and 130-2 to be transmitted to the sensor data collector 140 through the connecting unit 210. At this time, the response processing unit 250 removes the shim header from the CoAP sensor data response message.

Figure 3:
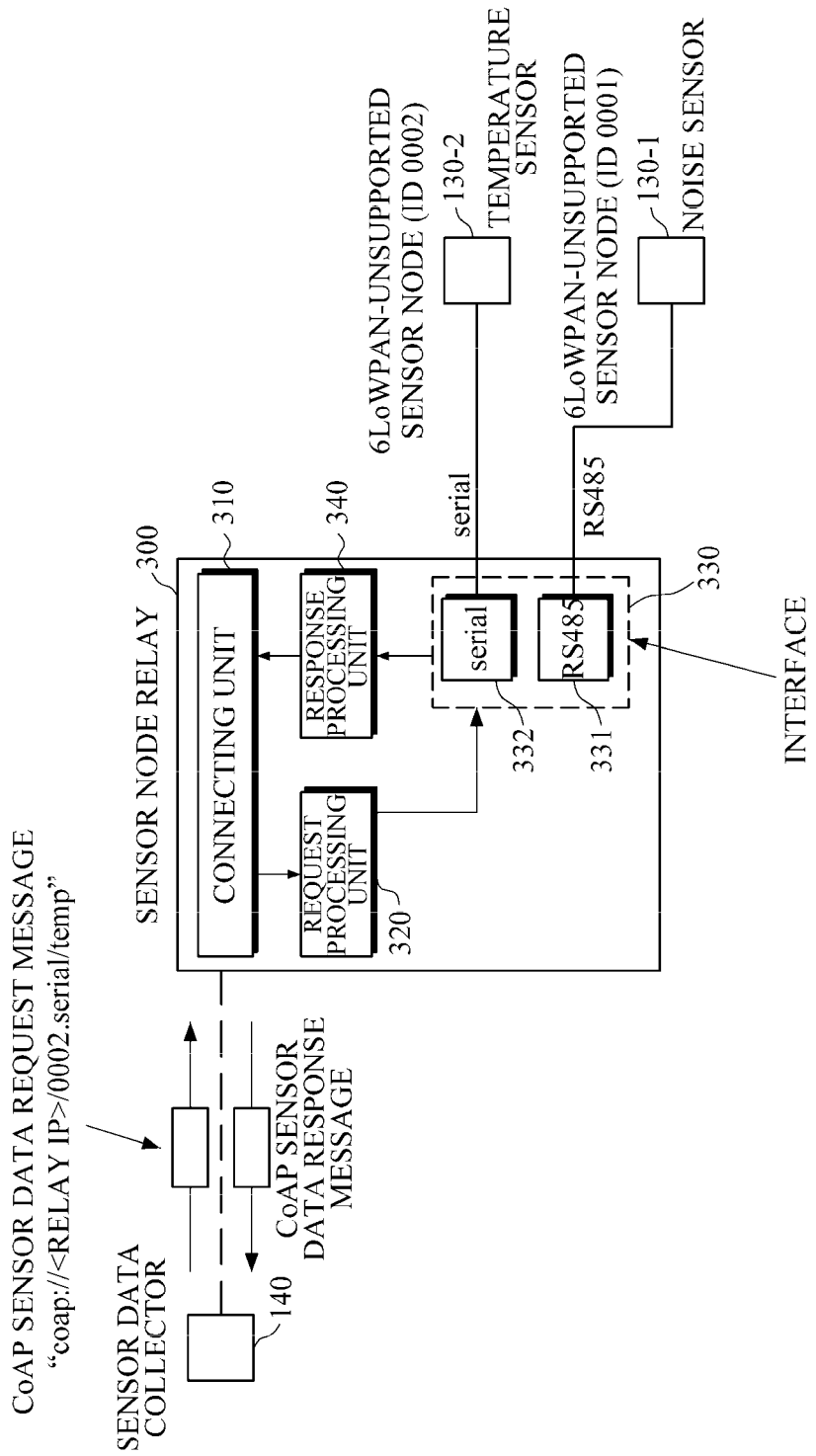
FIG. 3 a diagram illustrating a configuration of a sensor node relay according to another embodiment of the invention.

FIG. 3 is a diagram illustrating a configuration of a sensor node relay according to another embodiment of the invention.

As illustrated in FIG. 3, the sensor node relay 200 specifically includes a connecting unit 310, a request processing unit 320, an interface 330, and a response processing unit 340.

The connecting unit 310 can access the TCP/IP-based Internet, and transmits and receives a CoAP-based message to and from the sensor data collector 140.

The request processing unit 320 analyzes the CoAP sensor data request message received from the sensor data collector 140 through the connecting unit 310. The URL of the CoAP sensor data request message may include a sensor node ID (0001), an interface (serial), and path information (/temp), for example, "coap://<relay IP>/0001.serial/temp."

Then, the request processing unit 320 transmits the CoAP sensor data request message through the interface 330 in order to connect to the sensor node corresponding to the sensor node ID included in the URL. However, in order to reduce its size, the header of the CoAP protocol message does not use the same information contained in headers of its upper layers. Therefore, information on the size of the CoAP message is obtained from the TCP or UDP header and ID information of both nodes that transmit and receive the CoAP message is obtained from the IP header. However, since the 6LoWPAN-unsupported sensor node, which does not use the TCP/IP stack, may not obtain the TCP or UDP header and the IP header, the response processing unit 340 needs to define a shim header including associated information, and transmits the shim header attached above the CoAP header. A detailed description of the shim header will be provided below with reference to FIG. 4.

The response processing unit 340 allows the CoAP sensor data response message including sensor data received from the sensor nodes 130-1 and 130-2 to be transmitted to the sensor data collector 140 through the connecting unit 310. At this time, the response processing unit 340 removes the shim header from the CoAP sensor data response message.

One aspect of a sensor node relay configured according to the present invention has been described, but the sensor node relay configured according to the present invention may also be applied to the sensor data collector.

Figure 4A:
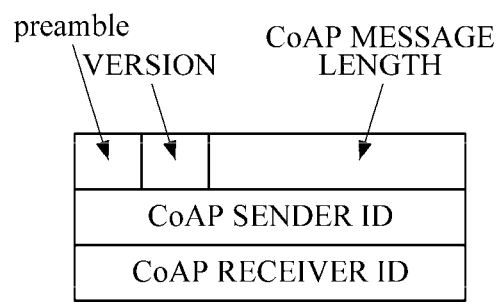
FIGS. 4A to 4C are diagrams illustrating a shim header format used for a 6LoWPAN-unsupported sensor node according to the invention.
Figure 4B:
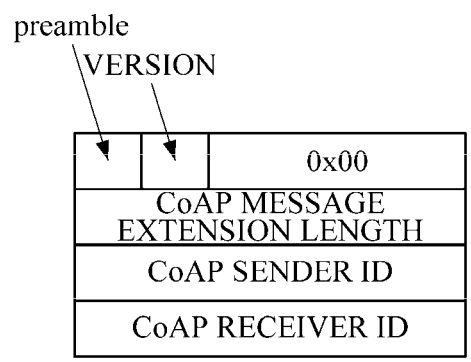
Figure 4C:
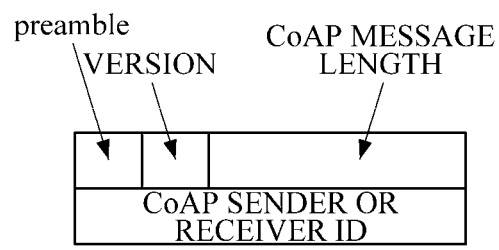

FIGS. 4A to 4C are diagrams illustrating a shim header format used for the 6LoWPAN-unsupported sensor node according to the invention.

As an embodiment, as illustrated in FIG. 4A, the format may be defined and used as, for example, a preamble indicating start of the shim header, version information on the shim header, length information on the CoAP message, and sender and receiver IDs of the CoAP message.

As another embodiment, as illustrated in FIG. 4B, when the size of the CoAP message is too large to be represented in the CoAP message length field of the shim header, the field may be filled with '0' values, and information on the size of the CoAP message may be inserted into the CoAP message extension length field, which is larger than the CoAP message length field.

As still another embodiment, as illustrated in FIG. 4C, when a sender or a receiver address of the CoAP message is known in advance, for example, a one-to-one connection interface, it is possible to define and use a format representing only the other node address, and not the known address.

Figure 5:
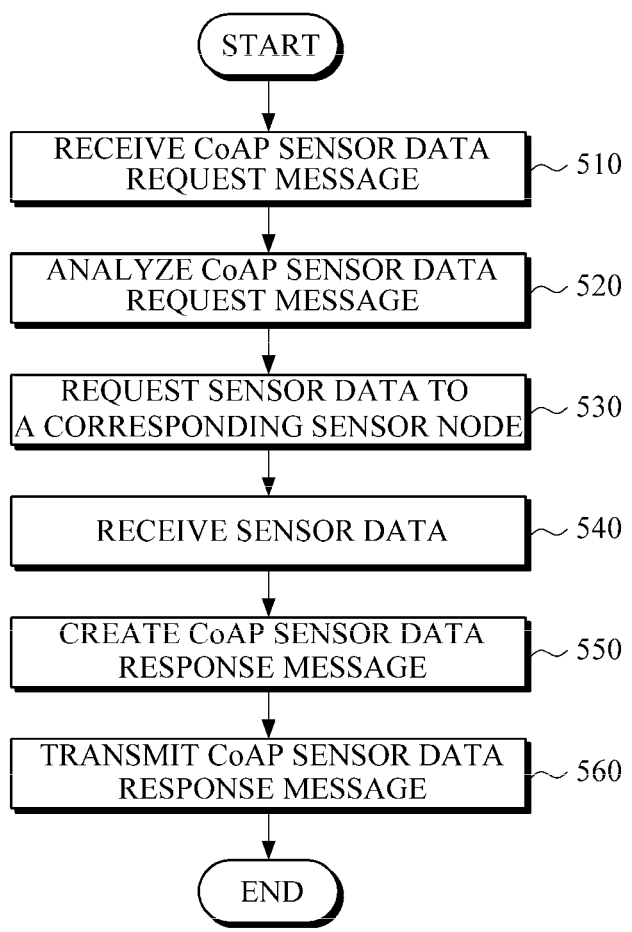
FIG. 5 is a flowchart explaining a method of supporting Internet-based sensor data transmission in the sensor node relay according to the embodiment of the invention.

FIG. 5 is a flowchart explaining a method of supporting Internet-based sensor data transmission in the sensor node relay according to the embodiment of the invention.

As illustrated in FIG. 5, the sensor node relay receives the CoAP sensor data request message from the sensor data collector in operation 510. However, in order to clearly identify each sensor node, when the sensor data collector requests data on an individual sensor node, it is necessary to add information on the sensor node into the CoAP URL, representing header content of the CoAP sensor data request message as general text.

Then, the sensor node relay analyzes the CoAP sensor data request message in operation 520 and requests sensor data from a corresponding sensor node in operation 530. However, in order to reduce its size, the header of the CoAP protocol message does not use the same information contained in headers of its upper layers. Therefore, information on size of the CoAP message is obtained from the TCP or UDP header, and ID information of both nodes that transmit and receive the CoAP message is obtained from the IP header. However, since the 6LoWPAN-unsupported sensor node, which does not use the TCP/IP stack, may not obtain the TCP or UDP header and the IP header, it needs to define a shim header including associated information, and transmits the shim header attached above the CoAP header. A detailed description of the shim header has been given above with reference to FIG. 4 and will not be repeated.

Two examples of operations 520 and 530, based on a CoAP URL configuration of a CoAP sensor data request message, will now be described.

In one example, only path information is included in the CoAP URL. In this case, the sensor node relay determines a sensor node ID corresponding to the path information of the CoAP URL and an interface to connect the sensor node, and transmits a sensor data request message to the corresponding sensor node through a determined interface. For example, the URL of the CoAP sensor data request message may include only path information (/temp), for example, "coap://<relay IP>/temp." Then, since the sensor node relay detects the path information (/temp) and has sensor node ID information on matching each path information, it detects a sensor node ID based on input path information and transmits the CoAP sensor data request message through the interface in order to connect to the sensor node corresponding to the ID.

In another example, a corresponding sensor node ID and an interface are explicitly represented in the CoAP URL. In this case, the sensor node relay transmits a sensor data request message to a corresponding sensor node through the interface, which is explicitly represented in the CoAP URL. For example, the URL of the CoAP sensor data request message may include a sensor node ID (0001), an interface (serial), and path information (/temp), for example, "coap://<relay IP>/0001.serial/temp." Then, the sensor node relay transmits the CoAP sensor data request message through the interface in order to connect to the sensor node corresponding to the sensor node ID included in the URL.

The sensor node relay receives sensor data from the sensor node in operation 540 and then transmits the CoAP sensor data response message to the sensor data collector in operation 550. At this time, the sensor node relay removes the shim header from the CoAP sensor data response message.

The exemplary embodiments should be considered in a descriptive sense only. It will be understood by those skilled in the art that various changes in form and details may be made therein without departing from the spirit and scope of the invention. Therefore, the invention is not limited to the above-mentioned embodiments and encompasses all modifications and equivalents that fall within the scope of the appended claims and their equivalents.

The present invention can be implemented as computer-readable code in a computer-readable recording medium. The computer-readable recording medium includes all types of recording media in which computer-readable data are stored. Examples of the computer-readable recording medium include a ROM, a RAM, a CD-ROM, a magnetic tape, a floppy disk, and an optical data storage. Further, the recording medium may be implemented in the form of carrier waves, such as those used in Internet transmission. In addition, the computer-readable recording medium may be distributed among computer systems over a network such that computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A sensor node relay comprising:
  a connecting unit configured to transmit and receive Internet Protocol (IP)-based messages to and from a sensor data collector;
  an interface configured to connect to one or more Internet-unsupported sensor nodes;
  a request processing unit configured to create a modified CoAP sensor data request by attaching a shim header above a header of a received CoAP sensor data request, and transmit the modified CoAP sensor data request to one or more of the Internet-unsupported sensor nodes through the interface; and
  a response processing unit configured to create an IP-based sensor data response including sensor data received from one or more of the Internet-unsupported sensor nodes through the interface and transmit the IP-based sensor data response to the sensor data collector through the connecting unit, wherein creating the IP-based sensor data response includes removing the shim header from a sensor data response received from the one or more of the Internet-unsupported sensor nodes, and wherein the shim header has a format other than an IP header format.

2. The sensor node relay according to claim 1, wherein the IP based messages are CoAp-based messages, and the Internet-unsupported sensor node is an Internet Protocol version 6 over Low Power Wireless Personal Area Network (6LoWPAN)-unsupported sensor node.

3. The sensor node relay according to claim 1, wherein the received CoAP sensor data request includes path information of a sensor node as a uniform resource locator (URL).

4. The sensor node relay according to claim 3, further comprising a sensor node management unit that includes sensor node ID information matching each item of the path information, detects a sensor node ID based on input path information and transmits the modified CoAP sensor data request through the interface in order to connect to the sensor node matching the sensor node ID.

5. The sensor node relay according to claim 1, wherein the sensor data request includes a sensor node ID, an interface and path information in a URL.

6. The sensor node relay according to claim 3, wherein the request processing unit transmits the modified CoAP sensor data request through the interface in order to connect to a sensor node corresponding to a sensor node ID included in the URL.

7. The sensor node relay according to claim 5, wherein the interface connects with one or more of the sensor nodes using one or more of a serial, RS485, and ZigBee communication method.

8. The sensor node relay according to claim 1, wherein the shim header includes a preamble indicating start of the shim header, version information on the shim header, length information on the modified CoAP sensor data request, and sender and receiver IDs of the modified CoAP sensor data request.

9. The sensor node relay according to claim 8, wherein, when size of the modified CoAP sensor data request is too large to be represented in a CoAP message length information field of the shim header, the shim header sets the CoAP message length information field to '0', and further includes a CoAP message extension length field for information on the size of the modified CoAP sensor data request.

10. The sensor node relay according to claim 9, wherein the shim header includes any one of a preamble indicating start of the shim header, version information on the shim header, length information on the modified CoAP sensor data request, and a sender or receiver ID of the modified CoAP sensor data request.

11. A method of supporting, in a sensor node relay, Internet Protocol-based (IP-based) sensor data transmission between a sensor data collector and one or more IP-unsupported sensor nodes, comprising:

receiving a Constrained Application Protocol (CoAP) sensor data request message from the sensor data collector;

creating a modified CoAP data request by attaching a shim header to the CoAP sensor data request;

transmitting the modified CoAP sensor data request to a corresponding Internet-unsupported sensor node;

creating an IP-based sensor data response including sensor data received from one or more of the Internet-unsupported sensor nodes; and transmitting the IP-based sensor data response to the sensor data collector, wherein creating the IP-based sensor data response includes removing the shim header from a sensor data response received from the one or more of the Internet-unsupported sensor nodes, and wherein the shim header has a format other than an IP header format.

12. The method of supporting Internet-based sensor data transmission according to claim 11, wherein the Internet-unsupported sensor node is an Internet Protocol version 6 over Low Power Wireless Personal Area Network (6LoWPAN)-unsupported sensor node.

13. The method of supporting Internet-based sensor data transmission according to claim 11, wherein the received sensor data request includes path information of the one or more Internet-unsupported sensor nodes in a Uniform Resource Locator (URL).

14. The method of supporting Internet-based sensor data transmission according to claim 13, further comprising:

detecting a sensor node ID based on input path information; and transmitting the modified sensor data request through the interface in order to connect to a sensor node corresponding to the sensor node ID.

15. The method of supporting Internet-based sensor data transmission according to claim 11, wherein the received sensor data request includes a sensor node ID, an interface, and path information in a URL.

16. The method of supporting Internet-based sensor data transmission according to claim 14, wherein the modified sensor data request is transmitted through the interface in order to connect the sensor node corresponding to the sensor node ID included in the URL.

* * * * *